US008716614B2

(12) United States Patent
Wassvik

(10) Patent No.: US 8,716,614 B2
(45) Date of Patent: May 6, 2014

(54) TOUCH PAD AND A METHOD OF OPERATING THE TOUCH PAD

(75) Inventor: Ola Wassvik, Lund (SE)

(73) Assignee: Flatfrog Laboratories AB, Lund (SE)

( * ) Notice: Subject to any disclaimer, the term of this patent is extended or adjusted under 35 U.S.C. 154(b) by 248 days.

(21) Appl. No.: 12/733,845

(22) PCT Filed: Oct. 10, 2008

(86) PCT No.: PCT/SE2008/000551
§ 371 (c)(1),
(2), (4) Date: Mar. 24, 2010

(87) PCT Pub. No.: WO2009/048365
PCT Pub. Date: Apr. 16, 2009

(65) Prior Publication Data
US 2010/0193259 A1 Aug. 5, 2010

Related U.S. Application Data

(60) Provisional application No. 60/960,689, filed on Oct. 10, 2007.

(30) Foreign Application Priority Data

Oct. 10, 2007 (DK) .................................. 2007 01462

(51) Int. Cl.
*G06F 3/042* (2006.01)
(52) U.S. Cl.
USPC ........ 178/18.09; 345/175; 345/173; 345/176; 345/87; 178/18.01
(58) Field of Classification Search
USPC ............. 178/18.09, 18.01; 345/173, 175, 176
See application file for complete search history.

(56) References Cited

U.S. PATENT DOCUMENTS

| 4,346,376 A | 8/1982 | Mallos |
| 4,484,179 A | 11/1984 | Kasday |

(Continued)

FOREIGN PATENT DOCUMENTS

| EP | 0897161 | 2/1999 |
| EP | 1126236 | 8/2001 |

(Continued)

OTHER PUBLICATIONS

European Search Report dated May 22, 2012 issued in European Application No. 08837005.1.

(Continued)

*Primary Examiner* — Alexander S Beck
*Assistant Examiner* — Amen Bogale
(74) *Attorney, Agent, or Firm* — Harness Dickey & Pierce, P.L.C.

(57) ABSTRACT

A touch pad is controlled to detect a location of one or more objects (16) on a touch surface (15) of a transmissive element (12). The touch pad includes at least two scanning arrangements (24-26, 28, 29) which are configured as optical scanning transceivers. Each scanning arrangement is adapted to provide a beam of radiation along a pertaining direction (18) in the transmissive element (12), such that the beam propagates inside the transmissive element (12) by total internal reflection. Each scanning arrangement is also adapted to receive radiation from the transmissive element (12) and from the pertaining direction (18), and output corresponding signal. Each scanning arrangement is further adapted to scan the pertaining direction substantially along the touch surface (15). A processing element is arranged to determine, on the basis of the signals from the scanning arrangements, one or more positions on the touch surface (15) where scattering/absorption of radiation occurs as a result of the touching object or objects (16).

22 Claims, 6 Drawing Sheets

(56) References Cited

U.S. PATENT DOCUMENTS

| | | | |
|---|---|---|---|
| 4,688,933 A | 8/1987 | Lapeyre | |
| 5,248,856 A * | 9/1993 | Mallicoat | 178/18.09 |
| 5,525,764 A | 6/1996 | Junkins et al. | |
| 5,775,792 A | 7/1998 | Wiese | |
| 5,945,981 A | 8/1999 | Paull et al. | |
| 6,122,394 A | 9/2000 | Neukermans et al. | |
| 6,229,529 B1 * | 5/2001 | Yano et al. | 345/175 |
| 6,492,633 B2 | 12/2002 | Nakazawa et al. | |
| 6,587,099 B2 | 7/2003 | Takekawa | |
| 6,648,485 B1 | 11/2003 | Colgan et al. | |
| 6,664,952 B2 | 12/2003 | Iwamoto et al. | |
| 6,927,384 B2 | 8/2005 | Reime et al. | |
| 6,972,753 B1 | 12/2005 | Kimura et al. | |
| 6,985,137 B2 * | 1/2006 | Kaikuranta | 345/175 |
| 7,359,041 B2 | 4/2008 | Xie et al. | |
| 7,705,835 B2 * | 4/2010 | Eikman | 345/176 |
| 2001/0002694 A1 * | 6/2001 | Nakazawa et al. | 250/221 |
| 2002/0163505 A1 | 11/2002 | Takekawa | |
| 2003/0048257 A1 | 3/2003 | Mattila | |
| 2003/0052257 A1 | 3/2003 | Sumriddetchkajorn | |
| 2003/0137494 A1 * | 7/2003 | Tulbert | 345/173 |
| 2004/0201579 A1 | 10/2004 | Graham | |
| 2004/0252091 A1 | 12/2004 | Ma et al. | |
| 2006/0114237 A1 | 6/2006 | Crockett et al. | |
| 2007/0024598 A1 | 2/2007 | Miller et al. | |
| 2007/0075648 A1 | 4/2007 | Blythe et al. | |
| 2008/0029691 A1 * | 2/2008 | Han | 250/224 |
| 2009/0273794 A1 | 11/2009 | Ostergaard et al. | |
| 2010/0277436 A1 * | 11/2010 | Feng et al. | 345/175 |

FOREIGN PATENT DOCUMENTS

| | | |
|---|---|---|
| EP | 11262236 | 8/2001 |
| EP | 1752864 | 2/2007 |
| EP | 0600576 | 5/2010 |
| GB | 2131544 | 6/1984 |
| GB | 2204126 | 11/1988 |
| WO | WO2005026938 | 3/2005 |
| WO | WO 2007/003196 | 1/2007 |
| WO | WO2007112742 | 10/2007 |
| WO | WO 2008/017077 | 2/2008 |
| WO | WO2008068607 | 6/2008 |

OTHER PUBLICATIONS

Office Action dated Aug. 12, 2013, issued in corresponding European Patent Application No. 08837005.1.

* cited by examiner

TOUCH PAD AND A METHOD OF OPERATING THE TOUCH PAD

CROSS-REFERENCE TO RELATED APPLICATIONS

This application is a National Phase entry of PCT Application No. PCT/SE2008/000551, filed on Oct. 10, 2008, which claims priority under 35 U.S.C. §119(e), 120 and 365 (c) to Danish Patent Application No. PA200701462, filed on Oct. 10, 2007, in the Danish Intellectual Property Office, and also claims priority to U.S. Provisional Application No. 60/690,689, filed on Oct. 10, 2007, in the U.S. Patent and Trademark Office.

TECHNICAL FIELD

The present invention relates to techniques for determining the position of one or more touching objects on a touch surface, which may be part of a touch pad or touch screen. More particularly, the inventive techniques are based on optical detection of the touching object(s).

BACKGROUND ART

Optical touch pads and touch screens may be seen in e.g. U.S. Pat. No. 4,346,376, U.S. Pat. No. 4,484,179, U.S. Pat. No. 4,688,933, U.S. Pat. No. 5,525,764, U.S. Pat. No. 5,945,981, U.S. Pat. No. 6,492,633, U.S. Pat. No. 6,664,952, U.S. Pat. No. 6,972,753, US2003/0048257, US2004/0201579, US2004/0252091, US2006/0114237, US2007/0024598, US2007/0075648, EP0600576 and EP1126236, as well as in WO2005/026938 and WO2007/112742.

The prior art also comprises U.S. Pat. No. 5,775,792, U.S. Pat. No. 6,122,394, U.S. Pat. No. 6,648,485, and US2003/0052257.

SUMMARY OF THE INVENTION

It is an object of the invention to provide an alternative to existing techniques for determining a position of one or more touching objects on a touch surface.

This and other objects, which will appear from the description below, are at least partly achieved by means of a touch pad, and methods of operating a touch pad according to the independent claims, embodiments thereof being defined by the dependent claims.

In a first aspect, the invention relates to a touch pad having a touch surface, the touch pad comprising: a radiation transmissive element having the touch surface and a second, opposite surface; at least two scanning arrangements, each being adapted to: provide a beam of radiation along a pertaining direction inside the radiation transmissive element, receive radiation from the radiation transmissive element and from the pertaining direction, and output a corresponding signal, and scan the pertaining direction at least substantially along at least part of the touch surface; and a processing element adapted to, on the basis of the signals from the scanning arrangements, determine a position on the touch surface where scattering/absorption of the radiation occurs.

By providing the beams of radiation inside the radiation transmissive element, only objects that are brought into close proximity to, i.e. essentially in contact with, the touch surface will cause scattering/absorption. Furthermore, the beams will generally not be blocked by the touching object(s), but instead a portion of the beam will continue in the pertaining direction downstream the touching object(s). Thus, by detecting signal attenuations in the output signals as a function of the scan, it is possible to unambiguously determine the positions of two or more objects touching the touch surface during one and the same scan.

By scanning the pertaining direction, the touch pad can be designed with few individual radiation sources and/or signal detectors. Furthermore, the spatial resolution of the touch pad may at least partly be controlled via the sampling rate of the scanning arrangements.

The touch pad contains at least two scanning arrangements, each being configured as an optical transceiver, which thus both provides and receives radiation in a common direction. The use of optical transceivers may facilitate the optical access to the radiation transmissive element. For example, transceivers may be arranged at only a few locations around the periphery of the radiation transmissive element. Generally, the use of optical transceivers enables the touch pad to be designed with a small footprint and/or a small thickness.

Each optical transceiver is configured to scan the pertaining direction, which means that the beam provided inside the transmissive element and the field of view for receiving radiation can be scanned conjointly. This allows each optical transceiver to be designed with a confined field of view, which may serve to increase the precision in the determined position(s) since the radiation is received from a confined region around the pertaining direction while the pertaining direction is scanned.

In this context, "transmissive" means that a sufficient amount of the radiation is transmitted to permit a sensible measurement. Absorption of radiation may or may not be a problem, depending on the extent of the transmissive element.

Normally, the transmissive element will be a generally flat element, but any shape, such as curved shapes, may be used.

The transmissive element may be adapted to guide the radiation by total internal reflection (TIR). Thus, the scanning arrangements may be adapted to launch the radiation in a direction at least generally parallel with the touch surface and adapted to receive radiation from that direction. Naturally, and as will be described further below, numerous manners exist of coupling radiation into and out of a transmissive element.

Suitable materials for the transmissive element may be glass, PMMA (polymethylmethacrylate) and PC (propylene carbonate).

The radiation will normally be guided in a direction of the touch surface. The radiation will, however, travel in directions at an angle to this surface and be reflected by the surfaces of the transmissive element. The overall direction, however, is not necessarily affected by such reflections. However, if one of the surfaces, as will be described further below, is provided with a scattering layer, such as an anti glare layer, the radiation inside the radiation transmissive element will be affected. This layer may scatter part of the radiation and thereby transform a collimated beam into a fan of radiation.

In this respect, the pertaining direction is the propagation direction of the beam along the touch surface as the beam is launched in the radiation transmissive element by the individual or actual scanning arrangement. Thus, the pertaining direction generally coincides with the main direction of the beam in the radiation transmissive element, whether the beam is collimated or not. The scanning arrangements may, and actually normally will, launch their beams along different pertaining directions in the transmissive element.

In one embodiment, the scanning arrangements are adapted to launch an at least substantially collimated beam of radiation into the transmissive element. Also, the scanning arrangements may be adapted to only detect radiation from a direction of the emitted radiation and potentially from a small angle around this direction, such as 20 degrees or less, such as 10 degrees or less, preferably 5 degrees or less, such as 1 degrees or less, such as 0.5 degrees or less, such as 0.25 degrees or less on either side of the direction of the beam. In this connection, the radiation to be received and radiation to be launched into the transmissive element may take different routes or be guided by different (but also the same) optical elements prior to launch into and after exit from the transmissive element.

In this respect, it may be desired that each beam is constituted by one or more collimated beams launched at least substantially in the plane of the touch surface, the one or more collimated beams of each beam covering, at the point of entrance into the transmissive element, at least 10% of a thickness of the transmissive element at that position. A narrow beam in a wide transmissive element will have the beam only intercept the first surface in the pattern of a number of concentric patterns. The larger an area or the larger a part of the thickness which is covered by the radiation, the larger a part of the surface is impinged by the radiation, thereby increasing the ability of a touching object to cause absorption/scattering. It may thus be desired that as large a part of the thickness is covered by the beam(s) (either a broad beam or a number of more narrow beams), so that, preferably, at least 20%, such as at least 40%, such as at least 50%, preferably at least 75% of the thickness of the transmissive element is covered by the beam(s).

When only radiation from the pertaining direction of the beam (including a confined angle around the pertaining direction) is detected, it is ensured that noise from other parts of the touch surface does not interfere with the measurement. This may be particularly interesting (see further below) when the radiation transmissive element has a scattering part or surface, such as an anti glare surface, which scatters each beam and causes it to broaden or expand in the plane of the touch surface. Thereby, radiation from each beam will impinge on a touching object before the pertaining direction of the beam is scanned in alignment with the position of touch.

The individual scanning arrangements may be operated individually or coordinated to scan the pertaining directions. As is mentioned above, the radiation will be guided along the touch surface even though it actually will "bounce" between the touch surface and the second surface in the element.

The actual area scanned by the scanning arrangements may be selected as desired.

As will be clear from the below, the scanning may take place in any of a number of manners.

In the above touch pad, a touch on the touch surface will bring about a scattering and/or absorption of the radiation travelling inside the transmissive element due to part of this radiation extending outside the transmissive element (and thereby interacting with the touching object) and due to the touching object breaking (frustrating) any TIR guiding and thereby coupling radiation out of the transmissive element. Thus, part of the radiation impinging on the touching object (finger, stylus, credit card, palm, nail, pen, or the like) will be absorbed, and part thereof may be scattered out of the transmissive element or back into the transmissive element in any direction.

Such scattering/absorption may be determined in a number of manners from the radiation received by the scanning arrangements. In one situation, radiation scattered by the touching object back towards the scanning arrangement may be determined. In another situation, the radiation having passed the position of touch travels further in the transmissive element and is reflected back towards the scanning arrangement, whereby the absorption/scattering by the touching object takes place twice, and whereby the absorption/scattering may be seen as a reduced intensity of detected radiation compared to neighbouring areas or compared to the situation where no touch occurs.

Then, the processing element may identify, from the signals of the scanning arrangements, localized phenomena, such as localized increases or reductions in detected radiation intensity and therefrom, combined with knowledge of the direction or position of the beam when detecting the phenomenon, determine the position of the touching object causing the absorption/scattering. This determination may be performed using e.g. triangulation based on angles associated with the directions of the beams. Other manners will be described further below.

In this respect, the processing element may be hardwired, such as an FPGA, DSP, or an ASIC, or may be software controllable such as a central processing unit or a microprocessor.

In this respect, the processing element may identify localized absorption/scattering, which may be an area or angle/distance of scan where the intensity of detected radiation varies with more than 1%, such as more than 2%, such as more than 5%, preferably more than 10% from that of other areas, such as neighboring areas.

In this context, it may be desired that a localized area is detected as an area, the edges of which has a signal value differing e.g. a factor times a noise floor of average noise level, such as 2, 3, 4, 5, 6, 7, 8, 10 or more times an average noise level or a noise floor. Naturally, a number of other manners may be used for determining the area. In addition, thresholding may be used to determine the area and boundaries thereof if desired.

In one embodiment, the processing element is adapted to, from the signal from each scanning arrangement, identify a coordinate of each of at least two scattering/absorption positions and to, on the basis of the coordinates determined, determine at least two touch positions.

In this respect, any coordinate system may be used, such as polar coordinates, Cartesian coordinate systems, or the like. Triangulation may be used, which makes use of the at least one known point along a direction of each beam, such as points or axes of rotation around which the beams rotate or sweep, as well as the actual angles of the beams when they impinge on the touching object that causes the absorption/scattering.

Thus, a coordinate may be a position, a distance, an angle or any other manner of determining a position.

Thus, one coordinate is derived from the signal from each scanning arrangement, and more than two or three coordinates may be used in order to increase the precision of the determination of the position.

In order to separate the coordinates of the signals relating to different positions of absorption/scattering, the processing element may be able to, from the signal from at least one of the scanning arrangements: determine, from a part of the signal having a first characteristic, a coordinate of a first scattering/absorption position, and determine, from a part of the signal having a second characteristic, a coordinate of a second scattering/absorption position.

In this context, a parameter for identifying the characteristics may be a width or shape of the position as determined or determinable from the signal part with the characteristic. Another parameter may be the amount of absorption/scattering of the radiation detected at the position.

Different characteristics may be different ones of width/shape/absorption/scattering or may be different values of width/shape/absorption/scattering or even combinations thereof.

Then, the processing element may be adapted to determine each scattering/absorption position from a set of coordinates comprising one coordinate for each scanning arrangement, each coordinate of a set of coordinates being determined from a part of the signal from a respective scanning arrangement, and the coordinates of a scattering/absorption position having corresponding characteristics.

In this context, corresponding characteristics may be selected in a number of manners, as it is remembered that what seems small at a distance, may seem large up close. Thus, an apparent size of a touch position seen from one scanning arrangement need not have the same size seen from another scanning arrangement. Very small positions/areas (i.e. touching objects) may, however, be separated from larger positions/areas (i.e. touching objects), if the difference is sufficiently large.

However, assumptions may be made as to the shape of a position, such as that the position is circular or oval/oblong/square or any other shape usual for objects touching a touch pad.

Another parameter may be the amount of absorption/scattering at the position, which may help in differing between different positions. Some objects absorb/scatter more than others, and it may be assumed that this is the same in all directions.

Also the distance from the scanning arrangement to the position may be taken into account, by the processing element being adapted to take into account (in the determination of a coordinate or position) an absorption/scattering of the radiation as a function of a distance between the touch position and the individual scanning arrangement.

The distance may be the distance along the touch surface while the radiation travels inside the radiation transmissive element, i.e. to an edge or in/out-coupling used for launching the radiation into and deriving the radiation from the radiation transmissive element. This is especially interesting when either non-negligible bulk absorption takes place in the transmissive element and/or the transmissive element has a scattering element or surface (such as an anti-glare surface).

This compensation may be made to the signals of the scanning arrangements before deriving positions, coordinates and/or characteristics or may be made during the calculations thereof.

As mentioned above, the scanning of the pertaining directions of the scanning arrangements may be performed in a number of manners. One simple manner is one wherein at least one of the scanning arrangements is adapted to scan the pertaining direction angularly inside the radiation transmissive element and around an axis of scanning. Thus, this would be an angular sweeping of the pertaining direction, and thus the beam, inside the transmissive element, where the pertaining direction is rotated around an axis of rotation. In this situation, the scattering/absorption position may be determined by the angles to the touching object as well as knowledge about the axes of rotation about which the scanning occurs.

In another situation, at least one of the scanning arrangements is adapted to scan the pertaining direction by translating it in a direction perpendicular to the pertaining direction inside the radiation transmissive element. This parallel scanning has a number of advantages, e.g. that a simple reflector may be used along edges of the transmissive element at least substantially parallel to the direction of scanning (perpendicular to the pertaining direction of the beam). Naturally, the beam may be angularly swept from a radiation provider to an in-coupling element which is adapted to launch the radiation (and derive radiation for a detector in the scanning arrangement) as a parallel scanning. In this manner, the coordinates may be used as Cartesian coordinates to determine the position.

As mentioned above, certain embodiments of the present invention may be especially useful under the difficult circumstances where an anti-glare coating or other scattering surface or layer is provided on the transmissive element. This type of transmissive element or additional element provided thereof as well as this type of overall effect may be especially useful in relation to touch screens, as this prevents both strong reflections in the screen, which would disturb a user watching the screen, and makes the information of the screen viewable from larger angles.

In one embodiment, the touch pad further comprises a reflector positioned at at least one edge portion of the radiation transmissive element and adapted to reflect radiation impinging thereon from inside the radiation transmissive element back along at least substantially the same direction. In this manner, an absorption measurement may be made in order to identify the position of the touch object(s) in that less radiation will be reflected and detected at a position of touch compared to a position with no touch. In a variant, the reflector may be integrated in the at least one edge portion, e.g. by making the edge portion reflective to radiation impinging thereon from inside the radiation transmissive element.

The reflector may be embodied as a standard planar reflector/mirror, or as a retro-reflector. In this respect, a retro-reflector is adapted to, as opposed to standard planar reflectors, reflect the radiation back toward the same direction no matter the angle of incidence of the radiation (naturally within reasonable boundaries defined by the technology of the retro-reflector), whereas this is only the situation for standard planar reflectors when the radiation impinges thereon exactly perpendicularly.

In one embodiment, the scanning arrangements comprise at least one beam-sweeping element which is controllable to scan the pertaining direction of at least two beams along the touch surface. Such a beam-sweeping element may be any type of element or combination of elements that is/are capable of deflecting a beam of radiation. Non-limiting examples of such deflection elements include a rotating mirror, a resonant mirror, a galvanometer mirror, a dispersive prism in combination with a tunable light source, a MEMS (Micro-Electro-Mechanical Systems) unit, a MOEMS (Micro Opto-Electrical-Mechanical Systems) unit, a liquid crystal, a vibrating mirror, an opto-acoustic unit, etc. The beams may be generated by one or more radiation sources, which can be any type of device capable of emitting radiation in a desired wavelength range, for example a diode laser, a VCSEL (vertical-cavity surface-emitting laser), or alternatively an LED (light-emitting diode), an incandescent lamp, a halogen lamp, etc.

In one embodiment, the at least one beam-sweeping element is arranged to receive the radiation from the transmissive element and direct the thus-received radiation onto a stationary detector by means of at least one reflective surface portion on the beam-sweeping element, wherein the scanning arrangements are configured such that said at least one reflective surface portion defines the field of view of the detector. This embodiment eliminates the need for mounting a separate element for defining the field of view. Instead, the size of the reflective surface portion and/or the distance between the reflective surface portion and the stationary detector are chosen to yield a desired field of view of the detector. The reflective surface portion may, e.g., be a facet of a rotating mirror, resonant mirror etc.

In one embodiment, the at least one beam-sweeping element is a rotating mirror which is arranged to scan the pertaining directions of at least two beams along the touch surface. This embodiment reduces the number of movable components required to scan the pertaining directions of the beams. Further, the scanning of the at least two beams is inherently synchronized.

In one embodiment, the at least one beam-sweeping element is arranged underneath the radiation transmissive element, wherein the scanning arrangements further comprise an optical folding system for directing the beams from said at least one beam-sweeping element to the plane of the radiation transmissive element. This embodiment may serve to reduce that extent of the touch pad in the plane of the transmissive element.

In one embodiment, each scanning arrangement further comprises at least one fixed beam-directing element which is arranged to receive the beams from the beam-sweeping element(s) and to cause the pertaining directions of the beams to be essentially invariant while they are being scanned along the touch surface. Such an embodiment with essentially invariant pertaining directions may facilitate the determination of the scattering/absorption position. Non-limiting examples of suitable beam-directing elements include diffractive optical elements (DOE), micro-optical elements, mirrors, refractive lenses and any combination thereof. Typically, the beam-sweeping element is an elongate component, along which the beam is scanned by the beam-sweeping element. A simple and robust construction may be obtained by arranging the at least one beam-directing element at an edge portion of the radiation transmissive element.

In one embodiment, at least one of the scanning arrangements is configured to scan the pertaining direction by translating the pertaining direction inside the radiation transmissive element.

If the radiation transmissive element is defined by linear edge portions, e.g. if the transmissive element is rectangular, each pertaining direction may be translated in a direction which is essentially parallel to one of said linear edge portions. This has been found to facilitate the design of the touch pad. For example, as described in the foregoing, an elongate beam-directing element may be fixedly arranged along the side of the transmissive element to define the pertaining direction of a beam in the transmissive element as the beam is swept along the beam-directing element.

In one embodiment, the touch pad further comprises a reflector positioned at at least one edge portion of the radiation transmissive element, wherein at least one of the scanning arrangements is adapted to direct the beam onto the reflector during the scan, while maintaining the pertaining direction essentially parallel to a normal direction of said reflector. As explained in the foregoing, this enables optimization of the performance of a retro-reflector or the use of a simple reflector.

In one embodiment, the touch pad may be combined with a display or monitor to form a touch screen, wherein the radiation transmissive element is positioned in front of the display/monitor with the second surface facing the display/monitor. The transmissive element may be radiation scattering, suitably with not more than 200 gloss units. The transmissive element may be a separate part which is added to the display/monitor, or the transmissive element may be integrated as a part of the display/monitor.

A second aspect relates to a method of operating a touch pad having a radiation transmissive element with a touch surface, the method comprising: providing at least two beams of radiation, each beam being launched along a pertaining direction inside the transmissive element; for each beam, receiving radiation from the radiation transmissive element and from the pertaining direction, and outputting a corresponding signal for each beam; scanning the pertaining directions at least substantially along at least part of the touch surface; and, on the basis of the signals, determining a position on the touch surface where scattering/absorption of the radiation occurs.

The second aspect may share features and embodiments with the first aspect as mentioned above, these features and embodiments producing corresponding effects and advantages.

For example, the scanning may be performed independently for all beams or may be coordinated.

Also, radiation may be received only along the pertaining direction and possibly from within a predetermined angle around the pertaining direction.

In one embodiment, the determination step comprises identifying, from the signal relating to each beam, a coordinate of each of at least two scattering/absorption positions and, on the basis of the coordinates determined, determining at least two touch positions.

As mentioned above, a number of different manners exist for obtaining this.

In one situation, the step of determining comprises determining, from a signal relating to a beam: a coordinate of a first scattering/absorption position from a part of the signal having a first characteristic, and a coordinate of a second scattering/absorption position from a part of the signal having a second characteristic.

A number of different characteristics and combinations thereof may be used.

Also, the determining step preferably comprises determining each scattering/absorption position from a set of coordinates, one coordinate relating to the signal of each beam, the coordinates of each scattering/absorption position being determined from a part of the signals with corresponding characteristics.

Thus, when multiple touches or other absorptions/scatterings take place, the coordinates thereof may be determined on the basis of suitably chosen characteristics which make it possible to distinguish between the positions.

It may be desired to have the determining step comprise taking into account, typically in the determination of a coordinate, an absorption/scattering of the radiation inside the radiation transmissive element. This is described in detail further above.

In one embodiment, the scanning step comprises scanning the direction of at least one beam angularly inside the radiation transmissive element and around an axis of scanning.

In another embodiment, the scanning step comprises scanning the direction of at least one beam by translating the pertaining direction in a direction perpendicular thereto inside the radiation transmissive element.

Different scanning manners and frequencies may be selected for individual scanning steps or elements if desired.

In one embodiment, the method further comprises the step of causing the beams from inside the radiation transmissive element to be reflected at or in an edge portion of the radiation transmissive element, back in at least substantially the pertaining direction.

A third aspect of the invention relates to a method of operating a touch pad having a radiation transmissive element with a touch surface and a second, opposite surface, the method comprising: operating each of at least two scanning arrangements to provide a beam of radiation along a pertaining direction inside the radiation transmissive element, to receive radiation from the radiation transmissive element and from the pertaining direction, and to output a corresponding signal, and scan the pertaining direction at least substantially along at least part of the touch surface; and determining, on the basis of the signals from the scanning arrangements, a position on the touch surface where scattering/absorption of the radiation occurs.

A fourth aspect of the invention relates to a computer program product comprising computer code which, when executed on a data processing system, is adapted to carry out the method according to the third aspect.

The third and fourth aspects may share features and embodiments with the first and second aspects as mentioned above, these features and embodiments producing corresponding effects and advantages.

BRIEF DESCRIPTION OF THE DRAWINGS

In the following, exemplary embodiments will be described with reference to the accompanying schematic drawings.

DESCRIPTION OF EXEMPLARY EMBODIMENTS

Figure 1:
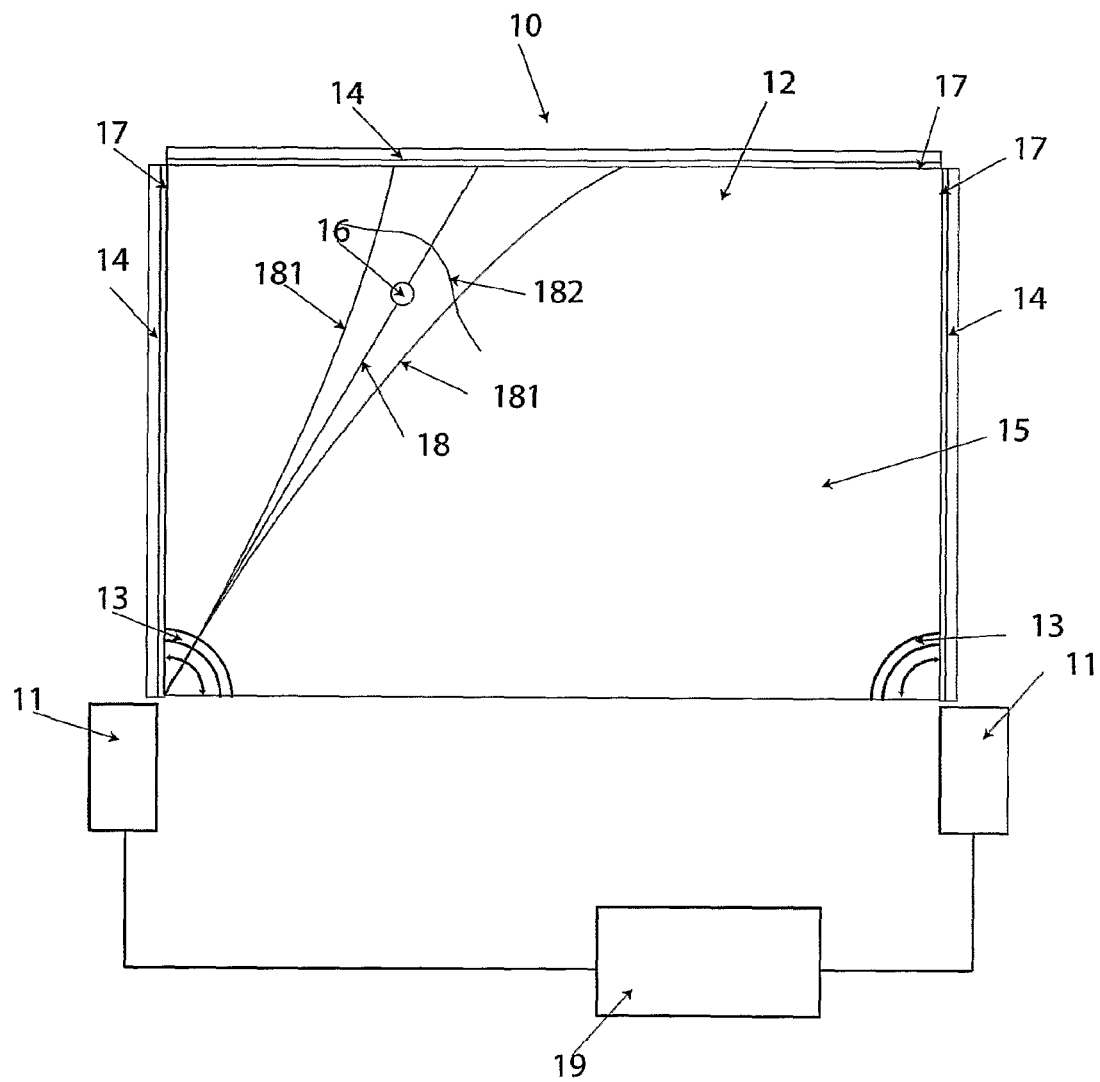
FIG. 1 is a top plan view of a first embodiment of a touch pad.

Throughout the drawings and the description, the same reference numerals are used to identify corresponding elements.

FIG. 1 illustrates a touch system/pad 10 according to a first embodiment. The touch system 10 comprises a radiation transmissive plate or element 12 with retro-reflectors 14 attached to any number of edges, wherein index-matched glue 17 or an item with similar capabilities, such as tape or oil, is used to attach each retro-reflector 14 to the plate 12. The retro-reflector 14 is a component that redirects incoming light straight back at the source. Two or more optical transceivers 11 are used to scan a respective beam 18 (only one shown in FIG. 1) across the plate 12. The scanning beam 18 is injected into the plate 12 by means of coupling elements 13.

The retro-reflectors can be of any kind that causes an incident beam to be reflected back in the same direction as that in which it was incident. In one example, each retro-reflector is a segmented mirror with segments all perpendicular to the source. In another example, the retro-reflectors are standard components such as corner cube retro-reflectors. These corner cube retro-reflectors can for example be Eaton Electrical 6201A-XXXX or 3M Diamond grade type retro-reflectors. In a simple case when the scanning beam 18 is perpendicular to the retro-reflector (as in the second and third embodiments shown in FIGS. 6-8) the retro-reflector may be replaced by an ordinary planar mirror.

When the scanning beam 18 interacts with a touching object 16 which can be any object that absorbs and/or scatters light/radiation, regardless of size, shape and light absorption/scattering potential, for example a finger, light is absorbed, the scanning beam 18 continues to travel through the plate 12 and is reflected by the retro-reflector 14 and hits the object 16 a second time by which time more of the energy in the scanning beam 18 is absorbed by the object 16. The scanning beam 18 then enters the transceiver 11 again and a signal is generated. The signals are received by a processor 19 which determines the position of the object 16 on the plate 12.

To be able to determine the position of the object 16, the angle(s) of the scanning beam 18 when it interacts with the object(s) 16 is/are detected for each transceiver 11. For example, the angle at which the scanning beam 18 interacts with the object 16 may be determined by looking at the time when this occurred in the generated signal. Time can then easily be transformed into angle, e.g. based on a known beam scanning speed/function of the transceiver. Thereafter, simple triangulation may be used by the processor 19 to determine the position on the plate 12 depending on the angles determined for the different transceivers 11.

Figure 9:
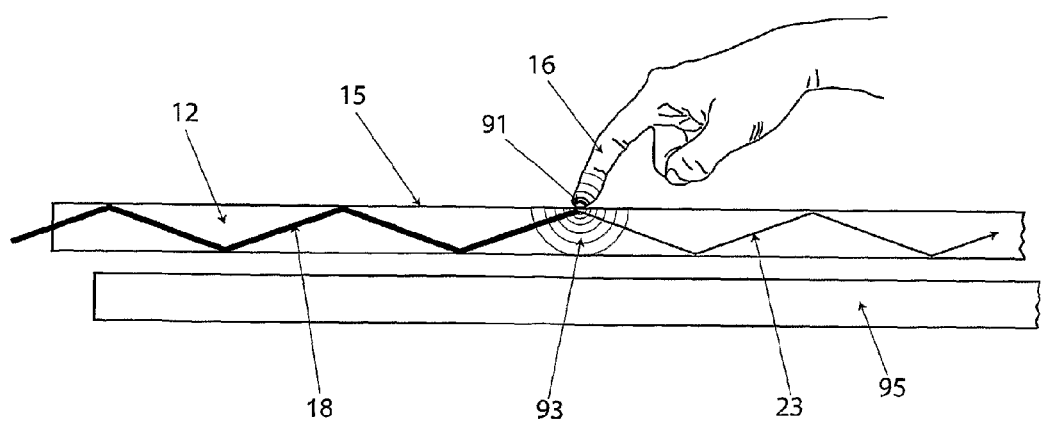
FIG. 9 illustrates guidance of radiation by TIR in the transmissive element.

FIG. 9 shows interaction between an object 16, which can be any object that absorbs light, e.g. a finger or a stylus. The unaffected beam 18 propagates by total internal reflection (TIR) through the plate 12. At a certain point on the top surface 15 it hits the object 16. Some of the energy in the unaffected beam 21 is absorbed (at 91) in the finger, some is scattered (at 93) by the finger and a signal-containing beam 23 continues its way by TIR in the plate 12.

The reason that only part of the energy interacts with the object 16 is that there is generally not perfect optical contact between the top surface 15 and the object 16 due to a non-perfect surface of the object 16.

Figure 2:
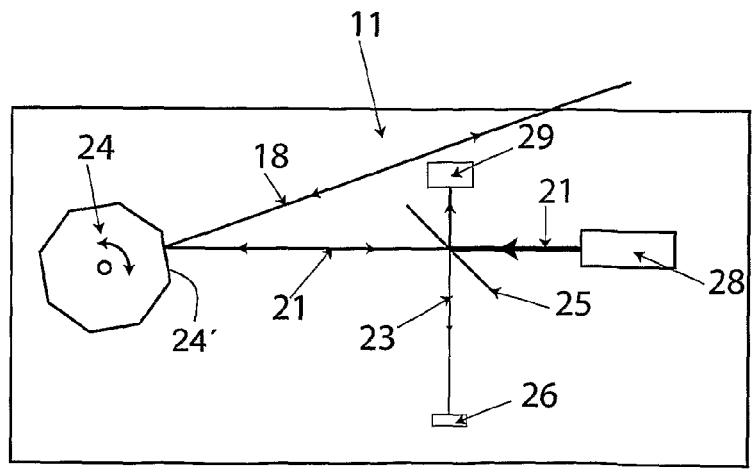
FIG. 2 is a top plan view of an example of a scanning arrangement for use in the embodiment of FIG. 1, as well as in other embodiments.

FIG. 2 shows an optical transceiver 11 emitting light from a light source 28, which can be any type of light source, e.g. a laser diode. The beam from the light source is preferably collimated; this collimation may be from the light source itself or a collimator (not shown) placed next to the light source. The original beam 21 emitted from the light source 28 hits a beam-splitter 25, which causes part of the energy in the original beam 21 to be re-directed for absorption by a light dump 29 and the remaining part to hit a movable beam-sweeping element 24, here a rotating mirror, which creates the scanning beam 18. When the scanning beam 18 returns from the plate 12, now in the form of a signal-containing beam 23, the returning beam hits the beam splitter 25 whereby part of the returning signal-containing beam 23 is redirected onto a detector system 26 and a signal is detected.

The detector system 26 can have any type of optics, specifying a field of view for the detector system 26. Especially, but not necessarily, when the beams have an expanding beam profile 182, it may be preferable to design the detector system 26 with a confined field of view, given by a maximum view angle. It is currently believed that the maximum view angle should be non-zero and less than about 40 degrees, typically less than about 20 degrees, and preferably less than about 10 degrees. In one working embodiment, the view angle is about 0.5-2 degrees. The field of view is, i.a., selected based on the performance of the electronic data acquisition equipment, the desired spatial resolution and the surface area of the plate 12.

In the implementation shown in FIG. 9, a screen/monitor 95 (LCD, plasma, OLED, etc.), or alternatively printed matter or the like, is positioned underneath the plate 12 to provide a graphical user interface (GUI) that transforms the touch pad into a touch screen. Touch systems that use fingers as input objects may have an anti-glare surface as the outmost surface towards the user. This is mainly due to two facts.

First, to be able to view the GUI from high angles in all kinds of lighting environments the surface needs to reject glares from such lighting. For example, when a person looks at a screen, he or she wants to be able to see all the information on the GUI and not have glares blank out parts of the GUI. An anti-glare surface/layer may reduce these glares to a minimum.

Secondly, when dealing with naked fingers i.e. when the skin actually touches the touch system's outer surface, the skin contact normally leaves a fingerprint on the surface. On a clear glass plate such fingerprints are clearly visible and are usually unwanted. If one places an anti-glare on a surface, such fingerprints are less visible since the structure of the fingerprint is similar to the structure of the anti-glare.

Thus, the touch screen 10 may have an anti-glare on the top surface 15. This top surface, however, will also act to scatter the radiation travelling inside the plate 12.

Anti-glares are specified in GU (Gloss units) where a high GU value gives more glares. Thus, a lower GU value will cause less glares and make fingerprints less visible, while causing the top surface 15 to be more scattering to the radiation in the plate 12.

In one embodiment, a GU value between 10 and 200 is desired to get enough glare and fingerprint reduction. A typical value would be 110 GU. The exact GU value of the top surface depends on the application and environment in which the touch system should be used.

The plate 12 can be made of a super white glass such as Schott BK270 since it has small absorption in the near infrared, although a normal glass such as Schott BK7 can be used if a higher absorption is preferred. Any material that is transmissive to the wavelength of light is usable. Other materials other than glass that can be used include plastics such as PMMA and PC.

The wavelength of the light source is preferably in the range of 800-1100 nm due to it being invisible to the human eye as well as good commercial detectors being available. In theory, any wavelength at which the plate 12 is transmissive is usable.

The scattering at the top surface 15 also depends on the incident angle of the scanning beam 18 towards the top surface 15. The steeper the incident angle the more scattering will occur. It may therefore be preferable to have the light from the scanning beam 18 hit the top surface 15 at a high angle, preferably 55-75 degrees to the normal of the top surface.

The effect of the scattering at the top surface 15 on the radiation in the plate 12 is that it creates a beam profile 182 inside the plate 12; the half-width 181 of this beam profile 182 increasing exponentially with respect to the distance from the transceiver 11, as indicated in FIG. 1. The scattering of the top surface 15 can be determined by measuring the GU value of said surface.

In this situation, it is preferred to have the detector detect only a small view angle in order to be able to distinguish two objects lying close to each other. If the view angle is too large the nature of the spreading of the scanning beam 18 in the scattering top surface 15 may cause the signals from the two objects to be indistinguishable from each other. The small view angle may cause all unwanted directionality of light to be discarded leaving only the centre of the scanning beam 18 containing the signal-containing beam 23.

Reverting to FIG. 9, this figure only shows the central ray in the scanning beam 18, whereas the scattering/beam widening caused by the scattering surface/layer 15 is not displayed here.

In FIG. 1, radiation is detected along the same main path as radiation is launched into the plate 12, including the coupling elements 13. This, however, is not necessary; the radiation may instead be detected away from the main path.

Figure 3A:
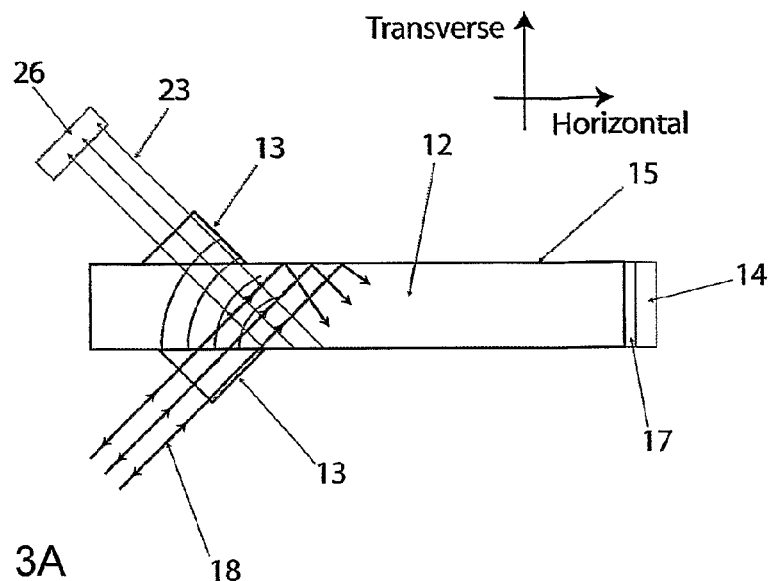
FIGS. 3a-3c are side views that illustrate a respective configuration for launching radiation into and coupling radiation out of a transmissive element.
Figure 3B:
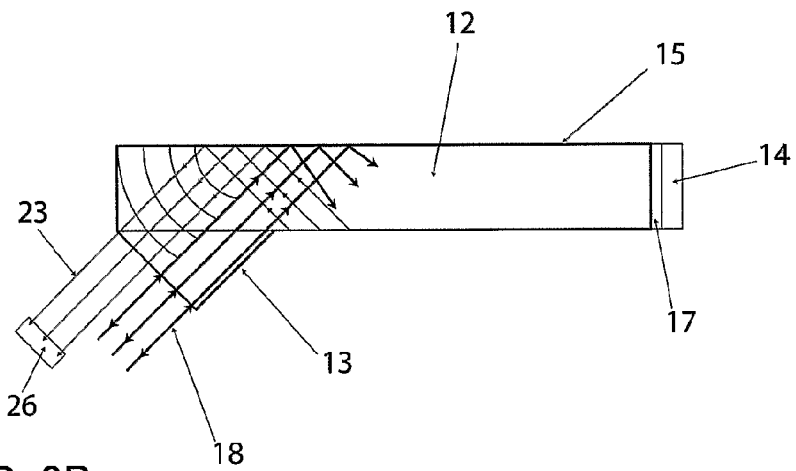
Figure 3C:
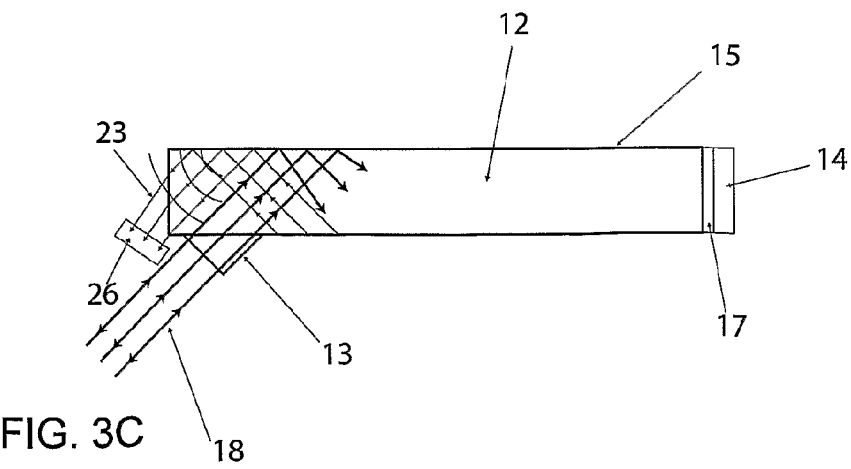

Different configurations enabling the injection and detection paths to be separated are further illustrated in FIGS. 3a-3b. These configurations are all alternatives to using the beam splitter 25 of FIG. 2. By using the fact that the top surface 15 is a scattering surface (caused by an anti-glare surface/layer and/or by dust/fingerprints/scratches) and thereby the scanning beam is broadened both in the horizontal plane as well as the transverse plane, the signal-containing beam 23 may be extracted from the plate 12 in several manners. In FIGS. 3a-3c, the effect of the scattering top surface 15 on the scanning beam 18 may be seen. Each total internal reflection of the scanning beam 18 broadens the beam in both the horizontal and transverse plane. When the scanning beam 18 has propagated through the whole plate 12, a number of such total internal reflections have occurred depending on the extent of the plate 12 as well as the thickness of the plate 12; thereafter it is retro-reflected by the retro-reflector 14 and again propagates through the plate 12, by then the scanning beam 18 contains all transverse directions i.e. it is more like a wave than a beam. From this scanning beam 18, the signal-containing beam 23 is extracted. Due to the fact that the scanning beam 18 at this stage contains all transverse directions, the signal-containing beam 23 can be extracted from any desired transverse direction. In the horizontal plane, the signal is still preferably extracted along the central part of the injected beam.

FIG. 3a illustrates the use of two coupling elements 13 to accomplish this task. The scanning beam 18 is injected through one coupling element 13 into the plate 12 and the signal-containing beam 23 is ejected through another coupling element 13 arranged on the opposite side of the plate 12.

In FIG. 3b, the same coupling element 13 is used to both inject the scanning beam 18 into the plate 12 and to eject the signal-containing beam 23. The coupling element 13 is in this case at least the same size as the scanning beam 18 and the signal-containing beam 23 combined.

In FIG. 3c, a coupling element 13 is used to inject the scanning beam 18 into the plate 12. Thereafter, the signal-containing beam 23 is ejected through the side of the plate 12.

One advantage of using a system where the scanning beam propagates inside the plate is that shadowing between objects does not take place. Even if two such objects are placed on a line, both objects may be seen/detected simultaneously. The reason for the shadowing not occurring was described in relation to FIG. 9 and is due to the fact that the radiation propagates inside the plate and only part of its energy is absorbed/scattered for each touch.

Furthermore, when several transceivers 11 are used, there is a known correlation between the signals from the different transceivers, from which the processor 19 (FIG. 1) may determine which signal part corresponds to which object.

This for example solves the problem of being able to distinguish a small object close to the transceiver 11 and a large object further from the transceiver 11 which both occupy the same angle, since it may be determined from the signal of another transceiver which object is which.

Figure 4:
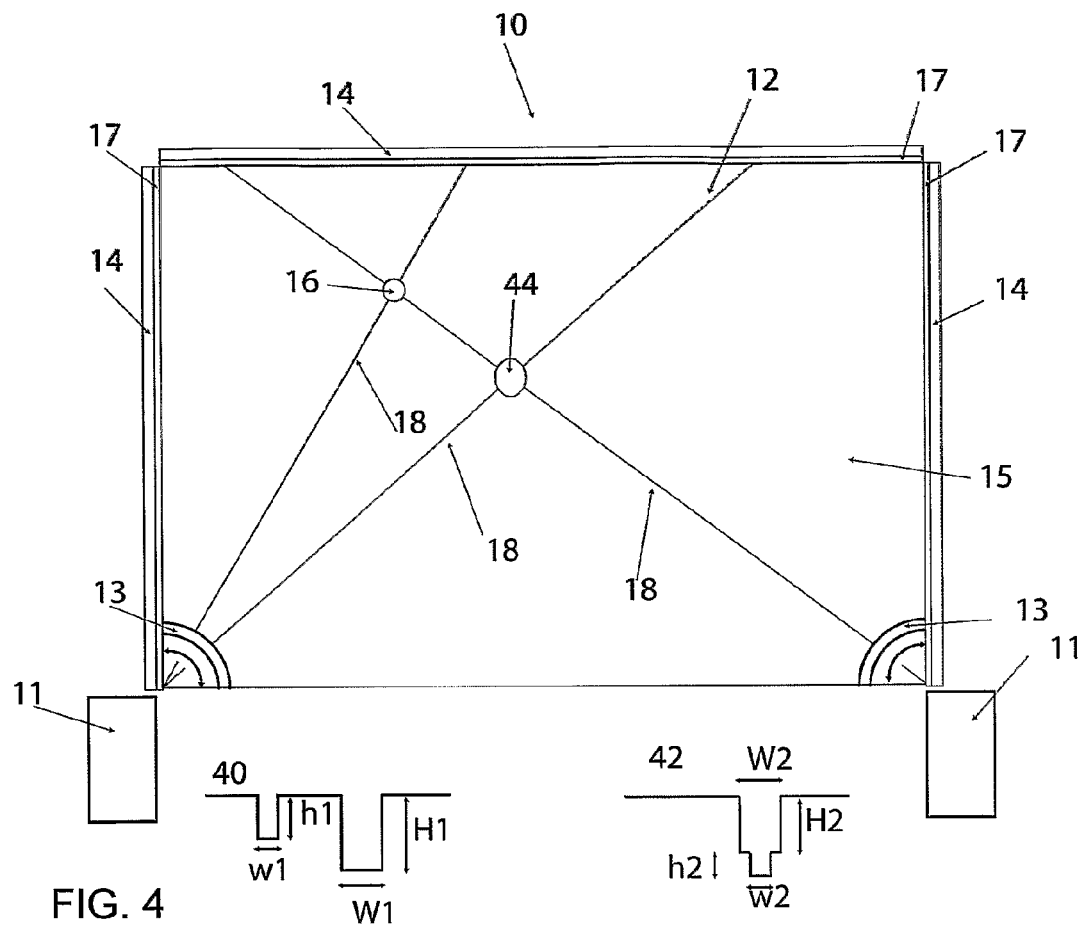
FIG. 4 illustrates detection of multiple touches in relation to the first embodiment in FIG. 1.

FIG. 4 shows the touch system 10 of FIG. 1 where several objects 16, 44 are placed simultaneously on the top surface 15. The scanning beams 18 from the transceivers 11 scan the plate 12 and the energy of signal-containing beam (cf. 23 in FIGS. 2, 3a-3c) is detected by the respective detector system (cf. 26 in FIGS. 2, 3a-3c) yielding a respective signal 40, 42. As seen, the signals 40, 42 differ between the transceivers 11. The different objects 16, 44 give rise to different signal characteristics in the signals 40, 42. Object 16 can be identified by signal characteristics w1 and h1 in signal 40 and w2 and h2 in signal 42, whereas object 44 can be identified by signal characteristics W1 and H1 in signal 40 and W2 and H2 in signal 42. Signal characteristics w1, w2, W1 and W2 depend on the apparent size of the objects 16, 44. Signal characteristics h1, h2, H1 and H2 depend on the absorption of objects 16, 44 as well as the size of objects 16, 44. By using at least two signals, the location of objects 16, 44 may be determined since each point of the signal 40, 42 corresponds to a point of time in the scan which corresponds to an angle of the scanning beam 18.

Since the background level may be regulated to a constant value (see below), any touches may be detected by allocating a threshold of minimum activity. Such a threshold may be determined from case to case depending on the desired touch sensitivity. Such a threshold is preferably set to differ from the background level by at least 2 times the average noise level of the background so as not to generate too many false touches. Any threshold level can be used and a reasonable one may be 10 times the background noise.

The width of a touch is determined as the distance between the points where the threshold level intersects the signal profile.

For facilitate the process of discriminating two touches that occur in the same scan direction, signal characteristics of a known touch may be subtracted from the signal, whereupon the same thresholding is performed once again on the thus-processed signal. For example, the approximate signal characteristics resulting from a finger that touches a surface is known, so once the processor 19 has determined that a touch has occurred, it may subtract a predicted signal profile of the touch from the signals, allowing the processor 19 to detect further potential touches inside the first touch, i.e. at the location of the predicted signal profile in each signal.

When the processor 19 is to determine positions of two or more simultaneous touches, it may pair the signals from the different transceivers 11 with each other. Pairing signals can be done by using the fact that one and the same object gives rise to signal characteristics in the signals generated by different transceivers 11, i.e. each object has the same absorption/scattering as well as approximately the same geometrical size with respect to each scanning beam 18. An algorithm in the processor 19 for pairing signals from two transceivers 11 could look as follows:

1. Pair the signals from different transceivers by choosing a combination of signal features, each given by one or more specific signal characteristics, as determined by the aforesaid threshold method.

2. Calculate the beam location that corresponds to the chosen signal features in each signal, and calculate the position as the intersection between the calculated beam locations.

3. Using the calculated position, calculate what the signal would look like (predicted signal profile) given the position, the absorption in the plate, and given that the object has a known absorption/scattering. This step may also take into account the variation of beam intensity with distance (e.g. approximated by the function in FIG. 5, see below).

4. Compare the calculated signal to the actual signal and assign a probability value that it is a correct position.

5. Repeat steps 1-4 for each possible combination of signal features in the signals from the transceivers.

6. Choose the signal feature pair with the highest probability and assign it as a true position.

7. Remove the predicted signal profiles of the chosen signal feature pair from the signals of both transceivers.

8. Repeat steps 1-7 until all positions have been determined.

Figure 5:
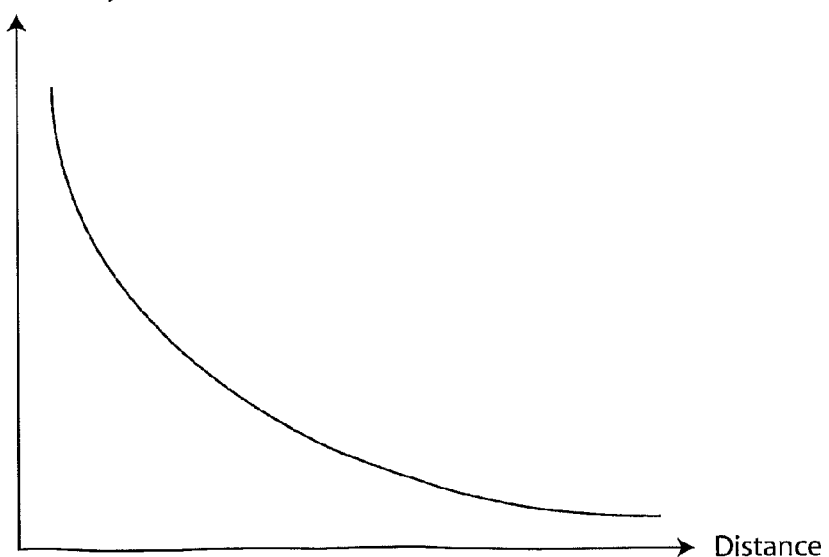
FIG. 5 is a graph that illustrates radiation loss as a function of distance in a transmissive element with e.g. an anti-glare surface.

If the beam is scattered when it is reflected internally against the surfaces of the plate 12, the intensity of the scanning beam 18 inside the plate will depend on the distance from the beam injection site. FIG. 5 shows an example of such a dependence of the scanning beam 18 intensity inside the plate 12. There are at least three causes for the decline in scanning beam 18 intensity.

Firstly, the scanning beam 18 is broadened by the scattering occurring on total internal reflection, if a scattering top surface/layer 15 is used. Thus, for each total internal reflection, some light is diverted away from the scanning beam 18 and the centre of the beam loses energy exponentially with distance in the plate 12. Another effect is that scattered radiation from the broadened beam re-enters the beam behind a touching object.

Secondly, if an anti-glare surface/layer is used, the total internal reflection is not perfect due to the structure of the anti-glare layer/surface, and a part of the radiation escapes through the surface for each reflection.

Thirdly, the bulk absorption of the plate 12 reduces the energy of the beam.

Figure 6:
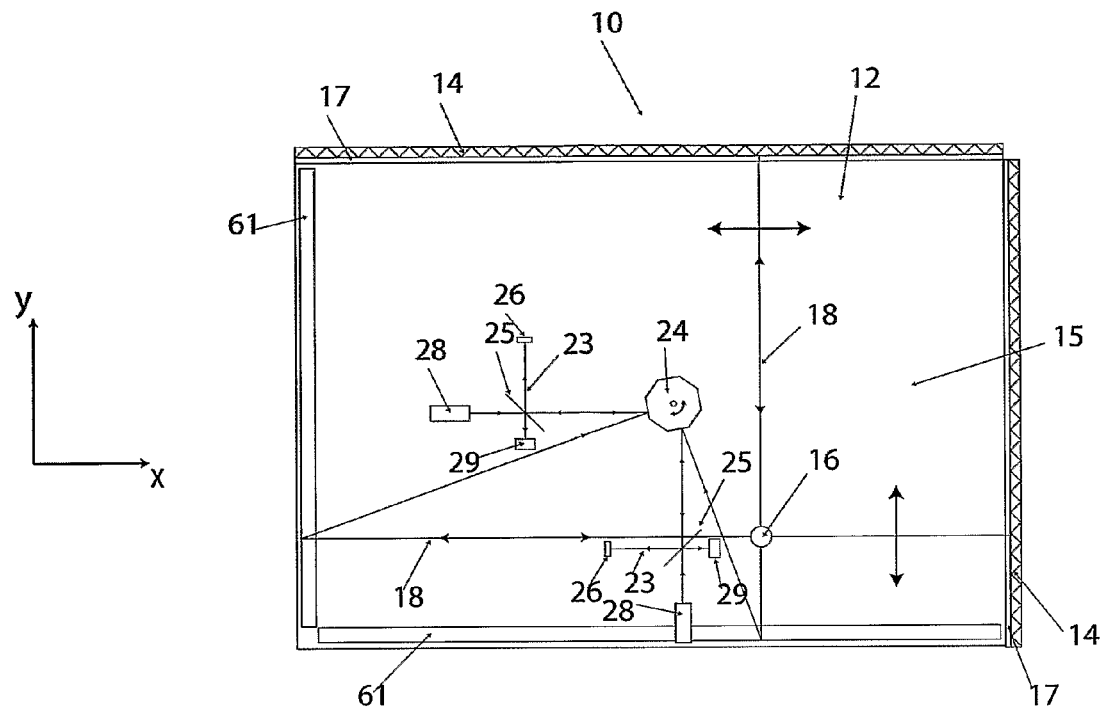
FIG. 6 is a top plan view of a second embodiment of a touch pad.

FIG. 6 shows a touch system/pad 10 according to a second embodiment involving an alternative structure for scanning the plate 12. Normally, for practical reasons, retro-reflectors 14 are corner cube reflectors but others, such as one-dimensional retro-reflectors can also be favourable. Corner cube reflectors work best at angles perpendicular or close to perpendicular to the reflector. Furthermore, they have a theoretical maximum user angle of 90 degrees centred on the normal direction of the reflector. In reality, though, the usable angle is closer to 60 degrees centred on the normal direction of the reflector. Therefore, it may be preferable to have a touch system where the scanning beams 18 are always close to perpendicular to the retro-reflectors 14. A fixed elongate coupling element 61 can be used to achieve this function. The coupling element 61 is designed to re-direct the scanning beam 18 as it is swept along the coupling element 61 such that the scanning beam is sent perpendicularly towards the retro-reflector 14 inside the plate 12.

As shown in FIG. 6, a system may be made that uses a single rotating mirror 24 to perform two scans of the plate 12, thereby saving components and cost. The two scans are performed independently of each other. This set-up is identical to using two separate transceivers 11 and can be considered as two such transceivers 11 merged into one for all intents and purposes.

In this embodiment with perpendicular beams, a direct correlation is automatically obtained between time in the sweep and position on the plate. A certain time in the sweep corresponds to a certain x or y coordinate. For example, if a constant sweep speed is used for sweeping the x dimension, which is not necessary, then, a point in time at the middle of a sweep corresponds to a beam location at the middle of the plate 12 in the x dimension.

In this embodiment, any screen/display or other GUI may be positioned between the plate 12 and the transceiver 11.

In a specific exemplifying implementation of the second embodiment, one rotating mirror 24 delivers two scanning beams 18 simultaneously towards two coupling elements 61 which inject the scanning beams into the plate 12 at an angle of 65 degrees to the normal of the top surface 15 of the plate 12. On the sides opposite to the coupling elements, two strips of Eaton Electrical 6201A-XXXX corner cube retro-reflectors are attached to the glass plate with index-matched UV-curing glue. The two scanning beams 18 scan the coupling elements with a constant angular speed, whereby the position where the scanning beam hits the coupling element 61 can be determined by the start and end of the sweep and the angular sweep speed, and thereby the position where the scanning beams 18 enter the plate 12 may be determined. Touches are detected as dips in the otherwise constant signal profile on the detector systems 26; the position of such touches can be determined by taking the position and direction at which the scanning beams 18 from each of the light sources 28 enter the plate and intersecting them with each other.

Figure 7:
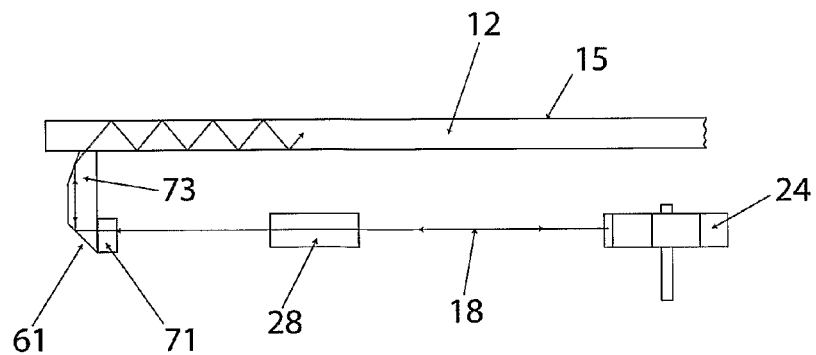
FIG. 7 is a side view of part of the second embodiment in FIG. 6.

FIG. 7 is a side view of the system in FIG. 6 and shows the function and configuration of the coupling element 61 in more detail. The coupling element 61 transforms an angularly swept beam 18, which is created by light from a light source 28 hitting a rotating mirror 24, into a parallel beam sweep in the plate 12.

Light is emitted from the light source 28, hits the rotating mirror 24, which sweeps the light along a beam-directing element 71, implemented as a direction-transforming lens. The lens 71, which may be a Fresnel lens, is configured to re-direct the light from the mirror 24 into a common pre-defined direction, for the incident angles that occur along the lens 71 during the sweep. Thus, after hitting the lens 71, all scanning beam directions 18, independently of the incident angle towards the lens 71, are parallel to each other. Thereafter, the light is reflected in a beam-folding element 73 and injected into the plate 12 at a chosen angle to the normal of the plate.

It is not necessary to reflect the light in the beam-folding element 73 but this saves space since the transceiver 11 can be placed underneath plate 12. In a variation of the second embodiment, the transceiver 11 is split into two separate transceivers 11, each with a respective rotating mirror, the transceivers being placed on two sides of the plate 12, preferably in the plane of the plate 12.

Figure 8:
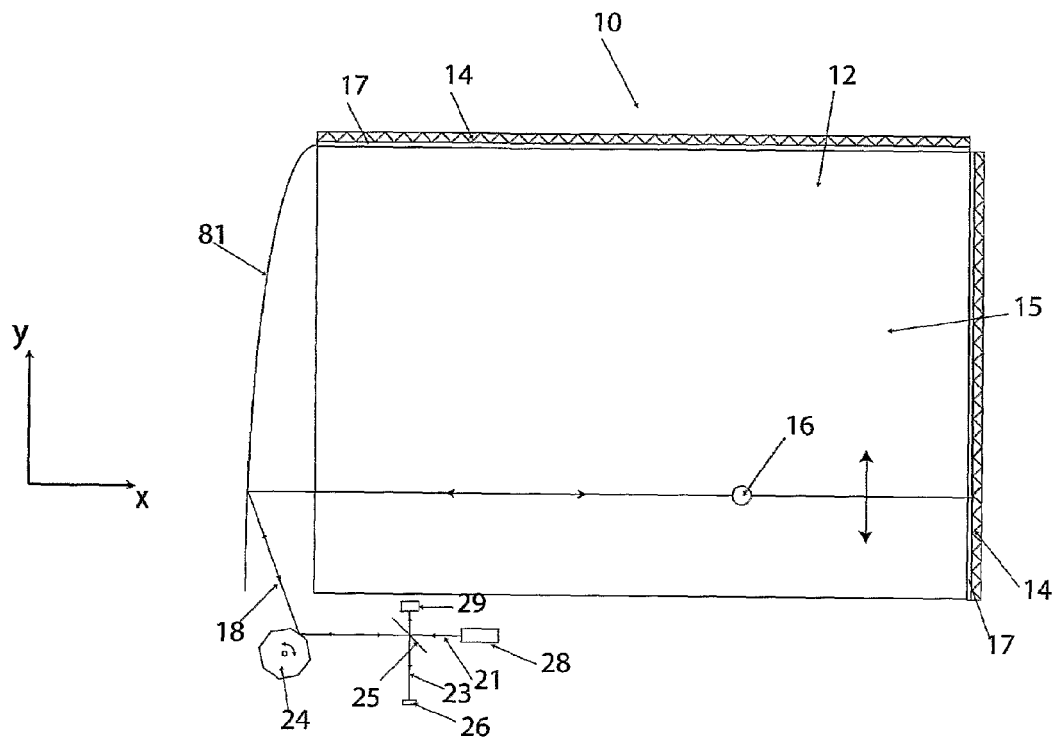
FIG. 8 is a top plan view of a third embodiment of a touch pad.

FIG. 8 illustrates a touch system/pad 10 according to a third embodiment involving yet an alternative structure for directing the light into the plate 12. If it is not desired or practical to place the transceiver 11 underneath the plate 12, e.g. to avoid an underlying screen/monitor (LCD, plasma etc.) to be fitted between the transceiver 11 and the plate 12, it may be desired to place the transceiver(s) 11 next to the plate 12. This may call for a different coupling element to transform the angular sweep to a parallel beam sweep.

To this end, the third embodiment includes a beam-directing element 81 in the form of a direction-transforming mirror which is placed along one edge of plate 12. Light is emitted from the light source 28 and hits the rotating mirror 24, which sweeps the light along the direction-transforming mirror 81. The mirror 81 is configured to re-direct the light from the mirror 24 into a common predefined direction, perpendicularly towards the retro-reflector 14, for all incident angles that occur along the mirror 24 during the sweep. The mirror 81 thus causes all incident scanning beams 18 to be reflected parallel to each other. After being reflected in the mirror 81, the light is injected into the plate 12 at a chosen angle to the normal of the plate, possibly via a coupling element (not shown).

Thus, the combinations of components 24-26, 28, 29 and 81 form a transceiver 11 that scans the beam 18 in the y direction of the plate 12. It is to be understood that a similar transceiver (not shown) is arranged at another non-parallel edge of the plate, to scan another beam in the x direction of the plate 12.

In the second and third embodiments, the provision of scanning beams 18 that are perpendicular to the respective reflector 14 may allow for a simplified structure and/or improved performance of the touch pad. Likewise, the determination of touch positions may be facilitated by such a beam arrangement. However, it is to be understood that the scanning beams 18 need not be perpendicular to the respective reflector 14 while they are translated across the plate. Depending on the type of reflector 14, each of the scanning beams may have any angle to the normal of the reflector 14 which is less than about ±30 degrees, and preferably less than about 20 degrees.

Also in the second and third embodiments, by ensuring that each of the scanning beams 18 has an essentially invariant direction while the beam 18 is swept across the plate 12, the position determination may be facilitated. However, it is to be understood that the direction of the scanning beam 18 may be allowed to vary during the sweep, e.g. due to inaccuracies in the components forming the transceiver 11, or as a design choice. In order to achieve an adequate precision in the determination of touch positions, it may be necessary to derive (e.g. via a calibration procedure) data on the beam direction/location in the plate as a function of time or as a function of the angle of the rotating mirror 24.

Figure 10:
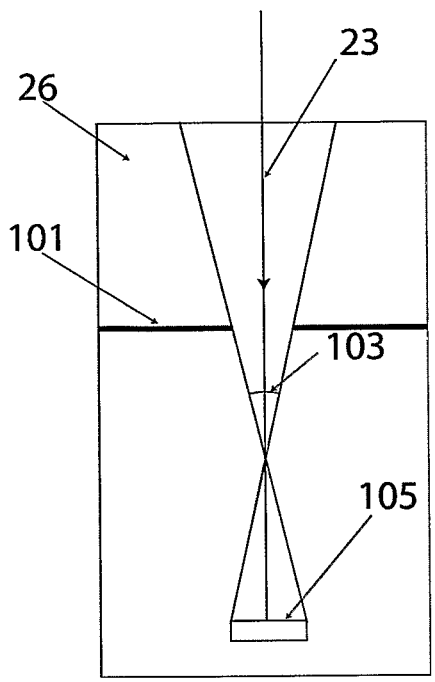
FIG. 10 is a plan view of an exemplifying detector system for use in the first, second and third embodiments.

FIG. 10 illustrates an exemplifying configuration of a detector system 26 which may be used in any one of the above-described embodiments. The system 26 may be pre-configured or controllable to provide an adequate view angle with respect to position resolution and signal-to-noise ratio. The detector system 26 includes an aperture stop 101 and a detector 105, which are spaced from each other to yield a view angle 103. It should be understood that the aperture stop 101 need not be part of the detector system 26, but could be located anywhere along the path of the signal-containing beam 23 in the scanning transceiver 11 (see e.g. FIG. 2) to provide a suitable effective aperture to the detector 105. In either configuration, the aperture stop 101 may be implemented by one or more dedicated elements that define a transmissive opening of desired size. Alternatively or additionally, the aperture stop 101 may be implemented by one or more reflective elements, for example in the scanning transceiver 11, which define a reflective area of desired size. In one such embodiment, the effective aperture is defined by the reflective facet 24' of the rotating mirror 24 (see e.g. FIG. 2) that directs the signal-containing beam 23 towards the detector. In certain embodiments, the detector system 26/transceiver 11 may be adjustable/controllable to change the view angle 103 by changing the distance between the aperture stop 101 and the detector 105. Alternatively or additionally, the detector system 26/transceiver 11 may be adjustable/controllable to change the view angle 103 by changing the size of either the aperture stop 101 or the detector 105 or both. Further optical elements can be placed on either side of the aperture stop 101 to improve the system performance.

In all of the above-described embodiments, contaminants such as grease and fingerprints are likely to cover the top surface 15 after some time of use. It may thus be desired to compensate the signal on the detector system(s) 26 for these contaminants to get a constant signal when there are no touches on the top surface 15. This compensation can be performed by adjusting the signal background level in an analogue or digital manner. It may also be accomplished by regulating/adjusting the power of the light source to get a constant signal background level.

The invention has mainly been described above with reference to a few embodiments. However, as is readily appreciated by a person skilled in the art, other embodiments than the ones disclosed above are equally possible within the scope of the invention. The different features of the invention could be combined in other combinations than those described. The scope of the invention is defined and limited only by the appended patent claims.

For example, it should be understood that although the position of touch could be determined based on absorption of injected radiation, the position of touch could alternatively be determined based on the scattering from the touching object. In the latter case, retro-reflectors may be omitted and the touch may be identified on the basis of received scattered radiation from the position of the touch. The scattered radiation may be detected along any of the detection paths used in the above-described embodiments.

Furthermore, touches can be detected on either side, or both sides, of the transmissive element 12.

In addition, it should be clear that the determination of a point of time of a scanning beam impinging on a position of touch may be replaced by the determination of the actual angle of the beam (or the beam-sweeping element).

Furthermore, all of the above-described embodiments may include a processing element that controls the scanning, the position determination, the contamination compensation, the adjustment of the detector system, etc. Such a processing element may be implemented by any suitable processing hardware, optionally in combination with controlling software.

The invention claimed is:

1. A touch pad having a touch surface, the touch pad comprising:
    a radiation transmissive element having the touch surface and a second, opposite surface, the radiation transmissive element being defined by linear edge portions;
    at least two scanning arrangements, each being adapted to:
        provide a beam of radiation along a pertaining direction inside the radiation transmissive element,
        receive radiation from the radiation transmissive element and from the pertaining direction, and output a corresponding signal, and
        scan the pertaining direction at least substantially along at least part of the touch surface, the pertaining direction of the beam being substantially invariant and essentially parallel to one of the linear edge portions while being scanned along the touch surface;
    a processing element adapted to, on the basis of the signals from the scanning arrangements, determine a position on the touch surface where scattering/absorption of the radiation occurs; and
    wherein at least one of the at least two scanning arrangements includes a rotating mirror arranged to scan the pertaining direction of the beam along the touch surface.

2. A touch pad according to claim 1, wherein the processing element is adapted to, from the signal from each scanning arrangement, identify a coordinate of each of at least two scattering/absorption positions and to, on the basis of the coordinates determined, determine at least two scattering/absorption positions.

3. A touch pad according to claim 2, wherein the processing element is adapted to, from the signal from at least one of the scanning arrangements:
    determine, from a part of the signal having a first characteristic, a coordinate of a first scattering/absorption position, and
    determine, from a part of the signal having a second characteristic, a coordinate of a second scattering/absorption position.

4. A touch pad according to claim 3, wherein the processing element is adapted to determine each scattering/absorption position from a set of coordinates comprising one coordinate for each scanning arrangement, each coordinate of a set of coordinates being determined from a part of the signal from a respective scanning arrangement, and the coordinates of a scattering/absorption position having corresponding characteristics.

5. A touch pad according to claim 1, wherein the processing element is adapted to take into account an absorption/scattering of the radiation as a function of a distance between the scattering/absorption position and the individual scanning arrangement.

6. A touch pad according to claim 1, wherein at least one of the scanning arrangements is adapted to scan the pertaining direction by translating the pertaining direction in a direction perpendicular thereto inside the radiation transmissive element.

7. A touch pad according to claim 1, further comprising a reflector positioned in or at least one edge portion of the radiation transmissive element and adapted to reflect radiation impinging thereon from inside the radiation transmissive element back along at least substantially the same direction.

8. A touch pad according to claim 1, wherein the scanning arrangements comprise at least one beam-sweeping element including the rotating mirror, which is controllable to scan the pertaining direction of at least two beams along the touch surface.

9. A touch pad according to claim 8, wherein said at least one beam-sweeping element is arranged to receive said radiation and direct the radiation onto a stationary detector using at least one reflective surface portion, wherein the scanning arrangements are configured such that said at least one reflective surface portion defines the field of view of the detector.

10. A touch pad according to claim 8, wherein said rotating mirror is arranged to scan the pertaining directions of at least two beams along the touch surface.

11. A touch pad according to claim 8, wherein said at least one beam-sweeping element is arranged underneath the radiation transmissive element, and wherein the scanning arrangements further comprise an optical folding system for directing the beams from said at least one beam-sweeping element to the plane of the radiation transmissive element.

12. A touch pad according to claim 8, wherein each scanning arrangement further comprises at least one fixed beam-directing element which is arranged to receive the beams from the beam-sweeping element(s) and to cause the pertaining directions of the beams to be essentially invariant while they are being scanned along the touch surface.

13. A touch pad according to claim 12, wherein said at least one beam-directing element is arranged at an edge portion of the radiation transmissive element.

14. A touch pad according to claim 8, wherein at least one of the scanning arrangements is configured to scan the pertaining direction by translating the pertaining direction inside the radiation transmissive element.

15. A touch pad according to claim 8, further comprising a reflector positioned at at least one edge portion of the radiation transmissive element, wherein at least one of the scanning arrangements is adapted to direct the beam onto the reflector during the scan, while maintaining the pertaining direction essentially parallel to a normal direction of said reflector.

16. A method of operating a touch pad having a radiation transmissive element with a touch surface, the radiation transmissive element being defined by linear edge portions, the method comprising:
    providing at least two beams of radiation, each beam being launched along a pertaining direction inside the transmissive element;
    for each beam, receiving radiation from the radiation transmissive element and from the pertaining direction, and outputting a corresponding signal for each beam;
    scanning, by at least two scanning arrangements, the pertaining directions at least substantially along at least part of the touch surface, the pertaining directions of each beam being substantially invariant and essentially parallel to one of the linear edge portions while being scanned along the touch surface; and
    on the basis of the signals, determining a position on the touch surface where scattering/absorption of the radiation occurs; and
    wherein at least one of the at least two scanning arrangements includes a rotating mirror arranged to scan the pertaining direction of the beam along the touch surface.

17. A method according to claim 16, wherein the determination step comprises identifying, from the signal relating to each beam, a coordinate of each of at least two scattering/absorption positions and, on the basis of the coordinates determined, determining at least two scattering/absorption positions.

18. A method according to claim 17, wherein the determination step comprises, from a signal relating to a beam, determining:
    a coordinate of a first scattering/absorption position from a part of the signal having a first characteristic, and
    a coordinate of a second scattering/absorption position from a part of the signal having a second characteristic.

19. A method according to claim 18, wherein the determination step comprises determining each scattering/absorption position from a set of coordinates, one coordinate relating to the signal of each beam, the coordinates of each scattering/absorption position being determined from a part of the signals with corresponding characteristics.

20. A method according to claim 16, wherein the scanning step comprises scanning the pertaining direction of at least one beam by translating the pertaining direction in a direction perpendicular thereto inside the radiation transmissive element.

21. A method according to claim 16, further comprising the step of causing the beams from inside the radiation transmissive element to be reflected at or in an edge portion of the radiation transmissive element, back in at least substantially the pertaining direction.

22. A method of operating a touch pad having a radiation transmissive element with a touch surface and a second, opposite surface, the radiation transmissive element being defined by linear edge portions, the method comprising:
    operating each of at least two scanning arrangements to provide a beam of radiation along a pertaining direction inside the radiation transmissive element, to receive radiation from the radiation transmissive element and from the pertaining direction, and to output a corresponding signal, and scan the pertaining direction at least substantially along at least part of the touch surface, the pertaining direction of the beam being substantially invariant and essentially parallel to one of the linear edge portions while being scanned along the touch surface;
    determining, on the basis of the signals from the scanning arrangements, a position on the touch surface where scattering/absorption of the radiation occurs; and
    wherein at least one of the at least two scanning arrangements includes a rotating mirror arranged to scan the pertaining direction of the beam along the touch surface.

* * * * *